Aug. 3, 1965                J. S. ROBERTS                3,198,966
         STEPPING SWITCH SYSTEM FOR SPACING THE STEPS
                  BY NON-DISCRETE TIME INTERVALS
Original Filed June 30, 1961                    4 Sheets-Sheet 1
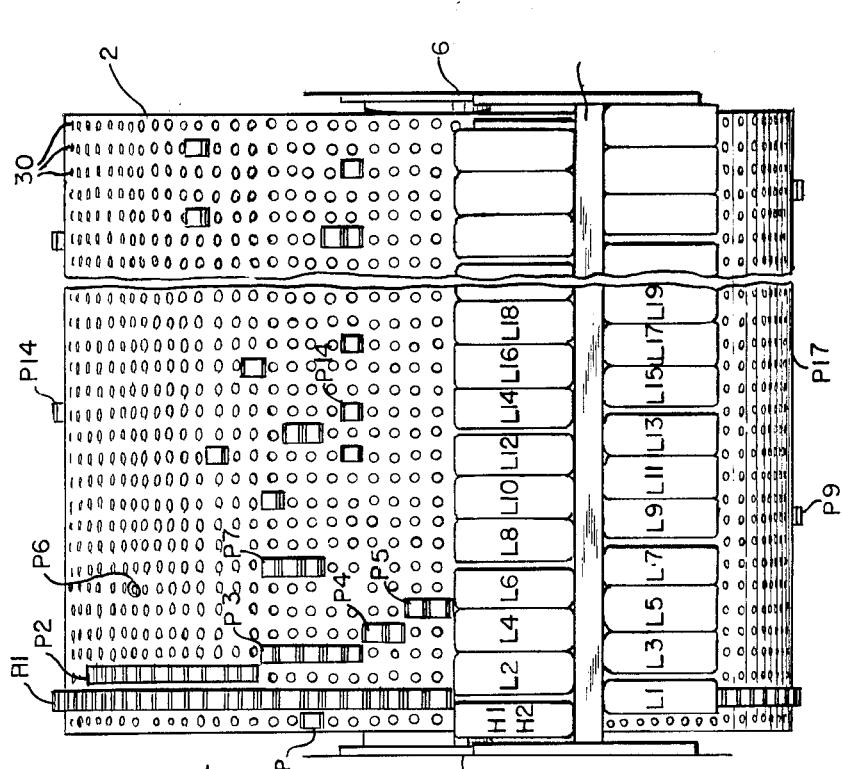
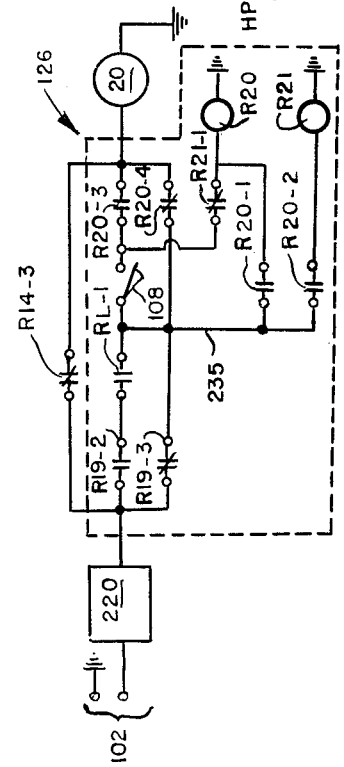
INVENTOR.
James S. Roberts
BY
Lazo & Barry
Attorneys

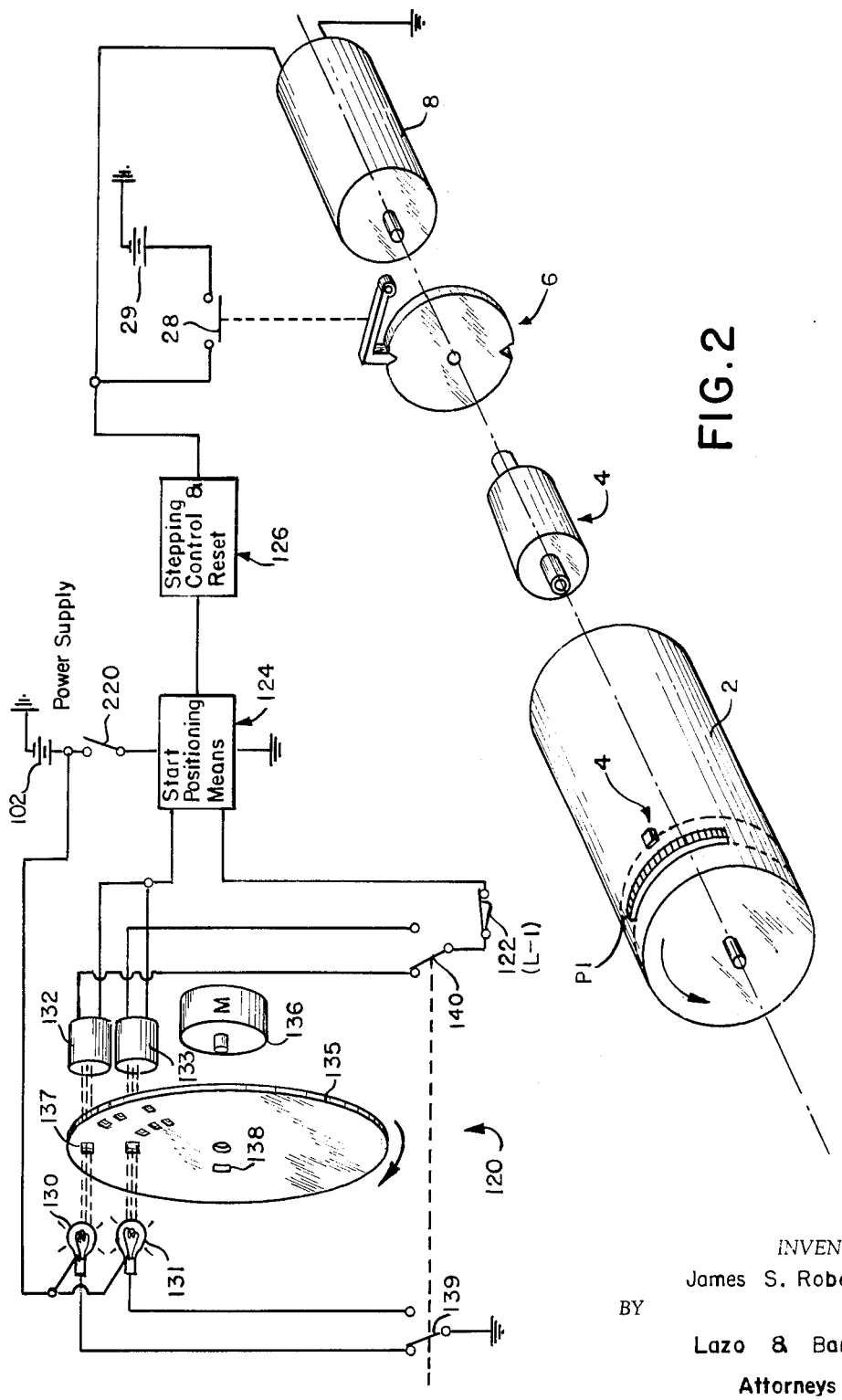

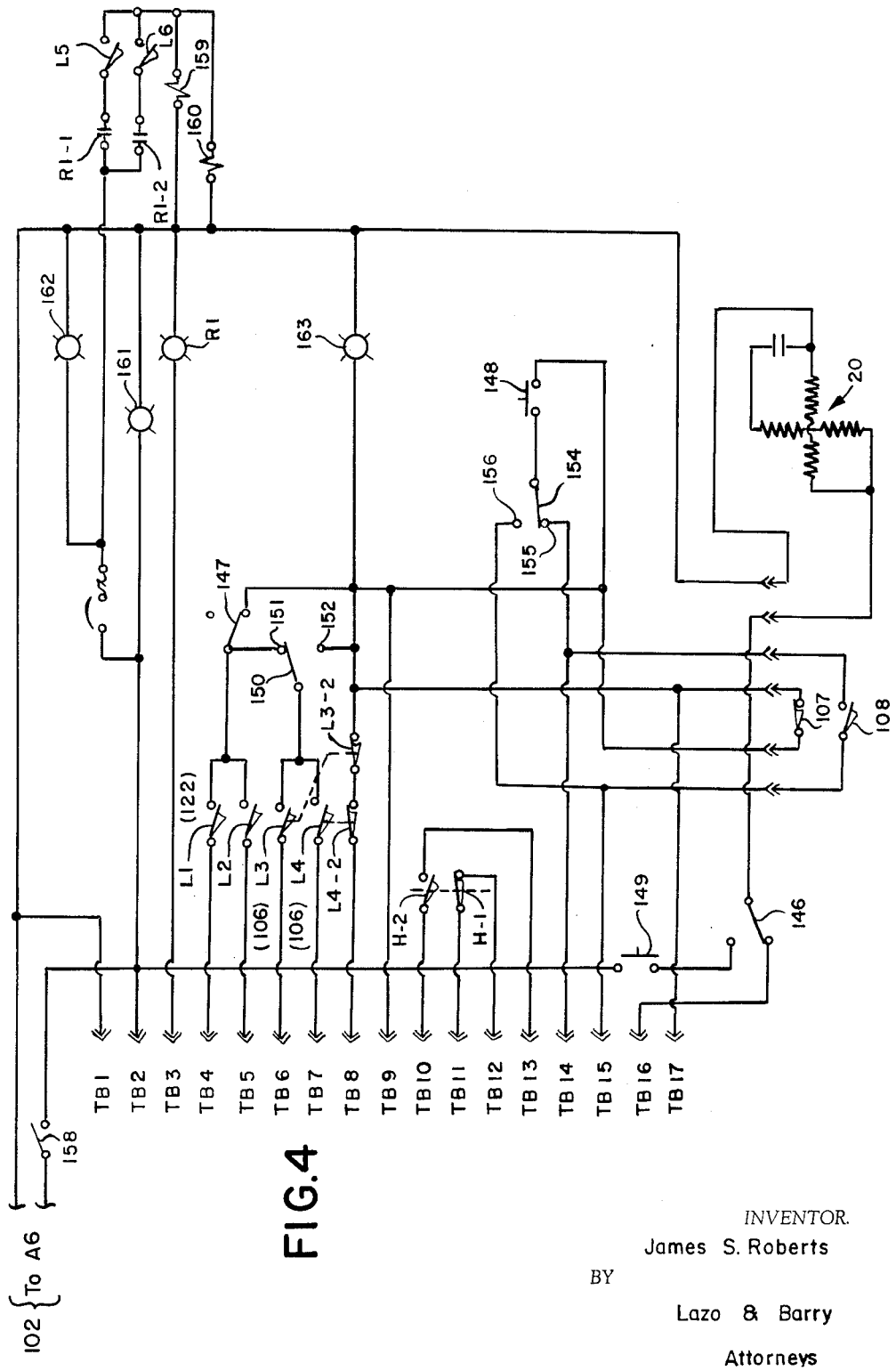

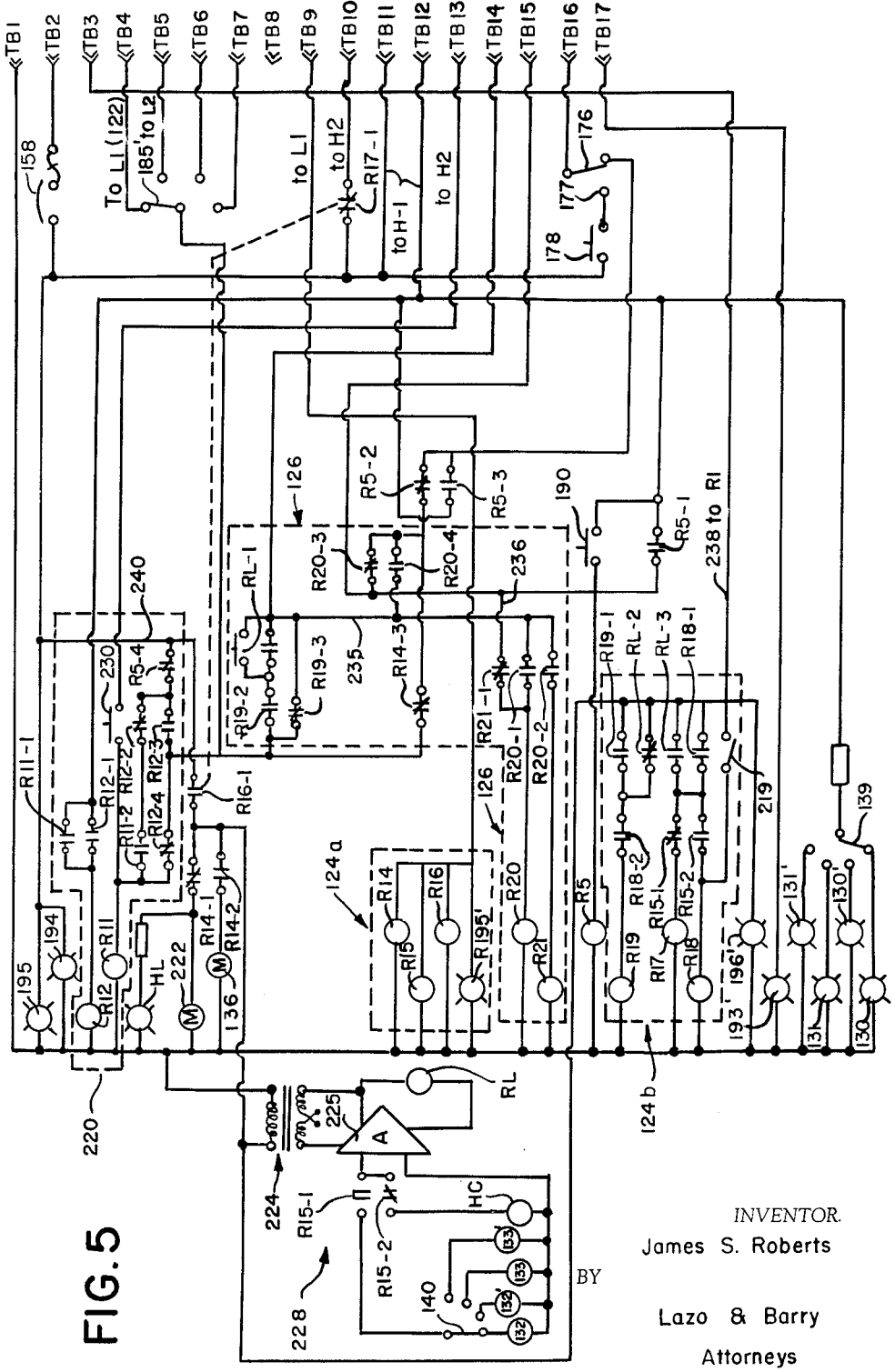

United States Patent Office 3,198,966
Patented Aug. 3, 1965

3,198,966
STEPPING SWITCH SYSTEM FOR SPACING THE STEPS BY NON-DISCRETE TIME INTERVALS
James S. Roberts, Brookfield, Wis., assignor to Milwaukee Chaplet & Mfg. Company, Inc., Milwaukee, Wis.
Original application June 30, 1961, Ser. No. 121,241. Divided and this application Dec. 14, 1962, Ser. No. 244,644
7 Claims. (Cl. 307—141)

This application is a division of Serial No. 121,241 filed June 30, 1961.

This invention relates to a means for controlling a sequence of operations and more particularly relates to that class of electrical switching means known as a stepping switch. The invention has special reference to a stepping switch with mechanical and electrical means for step-wise operation to control a sequence of events.

Stepping switches known in the art include a memory device which is structurally coded to provide a predetermined program. The coded structure ordinarily represents and actuates a desired sequence of switching operations. Each switching operation in turn controls one or more events such as operating a machine, admitting liquid into a tank, closing a valve or the like. The coded structure of the memory device accomplishes this by manipulating switches which the structure engages or disengages in the course of operation.

As a general rule, the memory device of such stepping switches is an intermittently rotating member. The intermittent rotation moves the member a fraction of a circle each time, dwells at the new position for some predetermined period of time, then moves to another position in like fashion and dwells again. This moving and dwelling during rotation is termed "stepping".

Ordinarily, the fraction of a circle moved and the length of time that the prior art stepping switches dwell are the same as between any two successive cycles of intermittent rotations. This restricts the time limits of the system controlled to multiples of a single dwell period since the switches manipulated by the memory device are maintained in (or out of) position during the dwell period, or during successively occurring dwell periods if the memory device so dictates. Where the control program of the system controlled requires widely varying control (or dwell) periods, it may be difficult if not impossible to program adequately on the memory device. Physical spacing is one reason for this. Further some control systems require interruption of the time sequencing when certain events transpire, e.g., a temperature rises too high, fluid flow drops too low, a chemical concentration exceeds its allowable tolerance, or a machine fails to perform properly.

The primary object of the present invention is to provide a stepping switch which is arranged to provide a predetermined sequence of operations of respectively different time intervals.

Another object of the present invention is to provide a stepping switch structure which responds to an interruption by some event other than time but which resumes stepping in a predetermined fashion after such interruption.

These objects are accomplished by utilizing a hollow perforated cylinder or drum fitted with removable pins as the memory device. The program is coded by the placement of the pins on the drum. The pins are arranged in rows extending both axially and peripherally of the drum and are aligned with suitable switches. Each axial row of pins represents an interval in the program. Certain peripheral rows of pins represent programs for channel selectors if there is more than one program available in the system. A second peripheral group of pins represents a means to connect the motor driving the drum with an appropriate time interval signal source whereby the drum is caused to dwell, thereby to move in a stepping manner. Dwell is achieved by stopping the motor. Still a third group of pins and their corresponding switches is arranged to control some function or machine element in the program of operation which is to be carried out. One or more functions, machines, etc. can thus be simultaneously controlled.

The present invention steps the drum at non-discrete time intervals by means of a beam of light which is directed at a photoelectric cell that is electrically connected to the drive motor for the drum. A perforated disc is used to chop the light at the end of the prescribed interval. The arrangement is such that the motor steps to its next position and then remains still until the disc which cops the light beam has moved an appropriate amount. In this fashion a dwell period of any length is provided at any particular time in the cycle without being restricted to sums or multiples of discrete time intervals.

Other objects, advantages and features will become apparent from the following description when read in conjunction with the associated drawings.

In the drawings:

FIG. 1 is a partial plan view of the memory device, or drum, showing the relationship of the drum and the associated structure to certain micro-switches engaged during a control program.

FIG. 2 is a simplified schematic partially exploded perspective electromechanical view of the invention for operating on non-discrete time intervals.

FIG. 3 is a simplified schematic representation of the electric circuits for FIGS. 2, 4 and 5 showing the operating portions free of starting means and the like presented primarily for purposes of explanation.

FIG. 4 represents schematically a function enabling and memory driving circuit.

FIG. 5 represents schematically a circuit for use with the circutit of FIG. 4 or a switch system for stepping in accordance with a stored program of non-discrete time intervals.

General

A stepping switch constructed in accordance with the invention includes a revolvable drum 2 (FIG. 1) mounted adjacent a row of switches H1, H2, L1, L2, L3 . . . . The drum is revolvable through 360° in a series of steps, stopping at the end of each step and dwelling or holding until signalled to step again. The rotation and stopping is controlled by electrical means, hereinafter described in more detail with reference to FIGS. 2-5. A plurality of pins HP, P1, P2, P3 . . . are located along the length of the drum with each of the so designated pins being located in rows. The pins in each row (each row of pins being designated as P1, P2 . . . ) correspond to and engage respective limit switches L1, L2, L3 . . . . The pins actuate the switches to initiate and terminate a series of control functions. Control functions can be carried out simultaneously or individually and in a predetermined sequence.

The pins, which are removable, are only inserted where a control function is desired, thus a predetermined sequence of functions or a number of sequences of functions may be set on the drum and thereby bring about the selected program of operation responsive to the stepping rotation of the drum as shown and described in the aforementioned application. The time intervals during which a control function is carried out are determined by the lengths of time that the drum dwells at different positions.

One homing pin HP is provided in alignment with homing switches H1, H2. The homing pin defines the position to which the drum is driven after a program has been completed. When the drum arrives at home, it stays there until another program, or the same program, is begun all over again.

The drum is driven by a driving means arranged to step the drum through 60 increments of 6° each to complete one revolution of the drum. Of course, other arrangements for stepping may be employed, but this is convenient because minutes and hours both have 60 seconds and minutes, respectively, and the drum is thus automatically divided into appropriate physical intervals representative of time intervals.

Thus it can be seen that the drum is pre-programmed by structure carried thereon which represents respective time intervals for stepping. Pre-program drums act as memory devices so that any process or control sequence may be stored or used later on. A plurality of control programs may be stored on the drum. Programs are easily changed in the field by relocating pins on the drum, or by slipping pre-programmed, interchangeable drums into the controller.

*Introductory description of non-discrete interval embodiment (FIGS. 2–5)*

FIG. 2 shows in skeleton detail certain characteristics of this embodiment. It will be observed that the drum 2, gear drive 4, dead centering means 6, and motor 8 are arranged in the same fashion as described in the parent application. A pulse source 120 provides starting pulses to drum motor 8 through a pulse source control switch 122, a start positioning means 124, and a stepping control and reset means 126. The dead centering switch 28 is in the circuit and continues to serve as a means for stopping the motor after it has arrived at its predetermined position, i.e. for stopping the motor after it has moved sufficiently to execute one step of the drum. The remainder of the circuit is provided to enable the drum to start in response to pulses from the pulse source so that the switch 28 can complete the circuit through itself from the power supply 29 to the motor. The stepping control and reset means 126 is arranged, as described below with reference to FIGS. 3–5, to reset itself responsive to the ending of a pulse from the pulse source. Thus, the pulses are long enough on a time basis so that the motor can step once, the resetting taking place after the motor has stepped.

It will be observed that there is a row of pins P1 arranged consecutively around the periphery of the drum. The row P1 assures that the circuit through 122 is maintained for the particular period of the control program indicated by the peripheral length of P1.

The pulse source contemplates a plurality of light sources 130, 131. A corresponding plurality of photoelectric cells 132, 133 is arranged on the other side of a light beam chopping disc 135 which is driven by a dial timing motor 136. The dial 135 has a plurality of slots 137 arranged therein. The slots are arranged in annular or circular rows so that one entire circular row comprises one program. An elongated homing slot 138 is provided for purposes which will be explained with reference to the homing operation.

Each disc 135 may include a large number of programs, each occupying its own annular ring of slots. As the disc is rotated, the slots establish a light beam from the source 130 to the photoelectric cell 132. The beam continues to exist for a length of time required for the slot 137 to pass between the light source and photo cell. This length of time should exceed that required for the motor 25 to step and stop responsive to the dead centering switch 28.

Each disc 135 ordinarily has a large number of programs stored thereon. Each program occupies its own annular circular track or path. With the embodiment shown, transient light from one light source may cause several of the photoelectric cells to produce pulses simultaneously. This occurs in random fashion and, if not controlled, serves to confuse the system and cause the drum to be stepped where stepping is not part of the program set forth in the slots on the disc.

The ganged selector switches 139, 140 serve to eliminate this transient light. Before operation the selector switches are moved to the positions shown thereby selecting the program indicated by the outermost row of slots 137. This program corresponds to that indicated and aligned with the pin row P1. The selector switches turn on only one light and establish a circuit from only one photocell to the start positioning means 124. In the embodiment shown, light 130 and photoelectric cell 132 have been placed in circuit.

Operation is believed to be evident from the foregoing. Briefly, however, it is to be understood that the selector switches are first put in position and when the starting system is closed, the system moves from its "home" position to a "zero time" position at which time the drum is synchronized with the first slot on the timing disc. Thereafter, operation requires merely rotation of the disc to intermittently establish light means in some predetermined fashion. Each time a beam is established between the light source and a cell a pulse is generated which causes the motor 8 to move off dead center and to drive to the next dead center position where it stops in response to switch 28 breaking the circuit. The light pulse then stops as the disc interposes itself between the source 130 and the cell 132, whereupon the reset portion of means 126 prepares itself to receive the next pulse. It is to be observed that the time interval for effecting a control function is realized by the length of time between the slots 137 and whatever program is selected on the disc.

*Introductory description of the embodiment of FIGURE 5*

The circuit of FIG. 5 is used in conjunction with the circuit of FIG. 4, assuming that the various manually operated switches are set in the positions shown in FIG. 4 and that switch 158 is closed. This allows four programs to be stored on the drum or on the disc, or on both as the case may be, as indicated by the switch arrangement of FIG. 4 and also by four light sources 130, 130', 131, 131' and by four photoelectric cells 132, 132', 133, 133' in FIG. 5. As evident, any suitable number of programs may be provided for in accordance with the number of lights, cells, annular rings of slots on the disc, and the like. In the embodiment shown four programs are allowed and accordingly the selector switch 185' of FIG. 5 is provided with four contacts for selecting one of the four programs. In the embodiment shown, it is assumed that the program controlled by the master switch L1 is selected.

Referring now to FIG. 5, manual function switch 219 is closed anytime the circuit is to be placed in operation. A plurality of signal lights 193', 196', 194 and 195 are provided as desired. Similarly, a manually operated reset circuit including normally open switch 190 and relay R5 are included, serving the same purpose as in the above application. The various elements of the stepping control and automatic reset means 126 (FIG. 2) are shown as are the portions of the start positioning means 124. The elements 124 and 126 will presently be described in detail. Starting circuit 220 receives power from terminal TB2 and by means of the holding circuit is used to start and maintain the system in operation until the starting circuit itself is disabled responsive to the motor 8 having driven the drum to a home position. Although not shown in FIG. 2, a homing motor 222 is provided so the disc can be rapidly driven to home position once a given program has been completed. Thus, there are two motors, the ordinarily slow operating electric motor 136 for driving the disc 135 through a program and the homing motor 222, all in addition to the drum motor 8.

A homing light HL and the homing cell HC are provided for cooperation with the homing slot 138 in the light chopping dic 135.

A transformer 224 receives power through the starting circuit 220 and applies it to a photoelectric cell amplifier 225 which latter receives signals from a selected one of the light cells, amplifies it, and then actuates a relay RL. Thus, there is provided a means for responding to a beam of light admitted through one of the slots 137 to thereby cause the drum motor to step responsive to such light.

The system of FIG. 5 is arranged to cooperate with FIG. 4 so that a particular program may be selected and when the system is started, both the drum motor 8 and the dial timing motor 136 are brought into synchronization on a time basis so that the drum is positioned in accordance with the disc 135. More specifically, the system is arranged so that the drum motor starts in response to a beam of light and drives one step to dead center, after which the beam of light cuts off and resets the system for the next operation. The details of this are described below but attention is now directed to the relay RL and its normally opened contacts RL1. The starting procedure and the cooperation of the elements of FIG. 5 are so arranged that RL1 starts the motor 8 when a beam of light strikes the light cell 132. Relay RL also controls two other contacts, normally open switch RL3 and normally closed switch RL2.

Returning for a moment to the starting circuit 220, a master switch 230 is connected across the power supply and in series with homing switch H2. A convenient relay R11 responds to closure of the master switch by actuating the holding relay R12 which latter is connected in series with homing switch H1. In doing so, R11 changes the state of normally open contacts R11–1 and R11–2 until the motor is moved on home position thereby opening contact H2 to disable relay R11 and closing switch H1 to thereby enable the holding coil R12 during the course of the entire program and until the drum has been returned to home.

The power supply to the timing disc motor 136, the homing disc motor 222 and the pulse source 120 (FIG. 2), 228 (FIG. 5) is independent of the starting circuit. The homing function of the pulse source is thus independent, in a fashion, of the drum.

The starting position means 124 as arranged in FIG. 5 is divided into two portions 124a and 124b. A plurality of parallel connected relays R14, R15 and R16 are disposed in the means 124a and connected to terminal 9 thence to the selector switch 185' and one of the pin switches, e.g. L1 (or L1 . . . L4). Relay L14 is provided to turn on the motor 136 at an appropriate time and, during homing operation, to turn on the homing motor 222, by manipulating contacts R14–1 and R14–2. The timing motor is operated during starting and homing and by normally closed contact R14–3.

Relay R15 manipulates switches R15–1 and R15–2 to thereby select the source of input signals to the pulse source amplifier 225. Normally open contact R15–1 channels signals from the selector switch 140 while normally closed contact R15–2 channels signals from the homing cell in the amplifier. Relay R15 also controls a portion of the circuit 124a by manipulating switches R15–3 and R15–4.

Relays R16 and R17 are a push-pull type of relay which control their contacts so that one is engaged and one is disengaged and so that it takes two signals applied first to one relay R16 and then to the other relay R17 to move the contacts out and then return them to their initial position. In other words when the contacts R17–1 are closed, those at R16–1 are open and vice versa. Switch contacts R17–1 are closed at home position.

Broadly speaking, the mode of operation of the stepping contact is to cause the drum motor 8 and move it off dead center. Termination of the pulse restores switch RL1 as well as the rest of the stepping control circuit 126 to appropriate positions, thereby resetting the means 126.

The starting procedure for this embodiment is arranged to bring the drum motor and drum into a timed relationship with the rotating light chopping disc 135. Also, the entire starting procedure arranges the circuit so that switch RL1 may operate as just described.

During starting these are two phases: skipping wherein only the drum motor 25 runs, and the drum is rotated until the first programming pin P1 engages its corresponding switch L1 and thereby starts the timing motor 136; and then a dwell of the drum during which time the timing motor drives the disc until a first pulse is produced to thereby start the control functions via L5, L6 . . . . The drum subsequently is stepped responsive to subsequent pulses. These two phases may also be described as: moving off home to zero position, and dwelling until zero time is established by the first pulse thereby beginning the control of functions. The latter position is termed the "zero time" position because that is when the drum motor 25 and the pulse source (i.e. disc motor 136) are brought into the proper timed relationship for carrying out the remaining stepping operation.

A description of the operations of the embodiment of FIGS. 4 and 5 will facilitate an understanding of the construction. At the outset, the various manually operated switches are moved to the positions shown in FIGS. 4 and 5 and switch 158 is closed to provide power. Switch 185' selects row P1 and switch L1 and the program, and switches 139, 140 select the light and light cell corresponding thereto. Moreover, as best illustrated in FIG. 1, for this embodiment, the row of pins P1 is arranged with all of the pins positioned adjacent each other and consecutively so that stepping operations during the control cycle are from one adjacent pin to the next whereby the program switch L1 is maintained closed. Moreover, attention is directed to the ganged switches R16–1 and R17– (FIG. 5) which are adjusted so that the latter is closed at the home position while the former is open at such position. Two relay coils R16 and R17 are alternately operated to respectively position the switches so that one is open when the other is closed. As it turns out, R16–1 remains closed during normal operations and R17–1 is open, the respective positions being reversed at the home position.

There are two home positions involved—one for the drum 2 and one for the light chopping disc 35. The disc is driven to its home position by the high speed motor 222 which conveniently is mounted on the same shaft as the synchronous timing motor 136.

Referring first to FIG. 5, the starting circuit 220 has a master switch 230 which starts the operation of this embodiment by being manually closed to thereby actuate the convenience relay R11 and to close the two contacts controlled thereby in order to set up the conditions for actuating the starting switch holding coil R12. Coil R12 is in series with the homing switch H1 across the power supply and is therefore disabled at the instant of starting because H1 is open at home.

However, referring to FIG. 3, the motor 8 is moved away from its home position by reason of a circuit through normally closed contacts R14–3. When the motor is off home, the holding coil R12 is enabled and changes the position of the contact switches controlled thereby, thus holding itself in and maintaining a power supply to the entire system until such time as the cycle has been completed. In order to do this, the homing switch H1 closes.

Also, when the motor moves off dead center, switch 28 closes and energizes relay R20 which in turn energizes relay R21. The contacts of relays R20, R21 have now changed state from that shown in FIG. 3.

With power now being supplied to the motor and to the system, the motor 8 starts and drives through a skipping operation (i.e. moving over center) until the first pin P1 (or P2, P3, P4 according to the setting of selector switch 185′) closes its corresponding switch L1 (122 in FIG. 6). The drum motor 8 now goes through an initial dead centering operation after which the drum dwells until it is time to step to the next succeeding pin after the disc 135 has furnished the first pulse. Referring for a moment to FIG. 3, the initial dead centering operation is carried out by a circuit to the motor through the normally closed contacts of R19-3 and/or R14-3, the cross coupling lead 235, and a circuit including the dead centering switch 28 and the now-closed (normally open) contacts R20-3. Also, relay R21 is actuated by closure of switch R20-2. The purpose in actuating relay R21 is to open the circuit through lead 236 to the coil R20.

With the switches in the circuit of FIGS. 3 and 5 in the position just described, the motor 8 dead centers in response to opening of the switch 28 because all other channels for power delivery have been disabled by opening appropriate switches. The channel through switch R14-3 is opened in response to closure of L1 when the three positioning relays R14, R15 and R16 are actuated to change the position of their respective contacts as shown in FIGS. 3 and 5. Pulse source motor selector R14 is thus actuated to select motor 136 for the duration of the cycle, at the same time rejecting the homing motor 222 and the homing light by opening the switch R14-1. The drum motor control circuit switch R14-3 is also opened at this time so that the dead centering operation can take place in response only and solely to the dead centering switch. The pulse source enabling switch control coil R16 is actuated in response to the closure of L1 and simultaneously with the motor selecting relay, thereby turning on the motors by closing switch R16-1 and opening the ganged contact R17-1. The pulse source is now in operation, the motor 135 driving the disc and power being delivered to the amplifier 225 through the transformer 224.

Simultaneously with operation of relays R14 and R16, the function and homing setup relay R15 is actuated to disable the homing setup relay R17 for the remainder of the control program (i.e. until switch L1 is open). The function setup relay also sets up the circuit to the function relay R1 of FIG. 4 by closing switch R15-2 to thereby set up a circuit to the zero time setup relay R18, the latter remaining de-energized until the first light pulse completes a circuit by closure of light relay R1-3.

Responsive to the closure of R18-1, a circuit through lead 238 is completed to relay R1 (FIG. 8) thereby causing the function switches R1-1, R1-2 . . . to close. Any pins axially aligned with P1 on the drum may now close their respective switches L5, L6 . . . to actuate the function control means designated generically for convenience as solenoids 150, 160.

In review, during startup the drum drives to the first pin in the selected row at which point the pulse source is started in operation by turning on the motor 136 and by actuating the function relay R1. The drum dwells in this position until the first pulse, causing certain switching operations, is sent into the system responsive to aligning a light 130, a cell 132 and a slot in the disc, as is shown in FIG. 4. During the dead centering operation or start up, the two reset relays R20 and R21 are actuated thereby changing the position of all of their contacts and in particular closing contacts R20-3 and R20-4. Relays R20, R21 are reset responsive to the first light pulse. Relay R20 memorizes the fact that the drum motor is off dead center while the relay R21 responds to the disappearance of a pulse to disable R20 and thereby reset the circuit of FIG. 7 for the next succeeding pulse, in a fashion to now be described.

Up to this time there has been no pulse sent into the system. The first pulse is utilized to arrive at the zero time by starting the control function and by resetting the circuit 126 for the next succeeding pulse. Means 124b, particularly relay coil R19, memorized the first (zero time) light pulse. There has been no control function carried out because no circuit to the function relay R1 via lead 238 has been completed—this requiring closure of either switch RL3 or switch R18-1. The pulses are of long enough time duration that the motor 8 has an opportunity to drive to its next succeeding dead center position, that is, to move the drum one stepping increment, at which time or later the pulse ends and thereby resets the circuit means 126 as will shortly be described.

With the appearance of the first pulse, the light relay RL changes the sense of its three contacts to close both RL-1 (in circuit 126—see FIG. 3) and RL-3 and at the same time to open contact R1-2. Closure of RL-3 actuates relay R18 and causes it to close both of its switches R18-1 (thereby holding itself in position) and R18-2 (thereby setting up relay R19). Relay R19 does not actuate at this time because both of the switches capable of energizing it (R19-1 and RL-2) are open; actuation and pulse memorization occur when the first pulse ends and RL2 closes. However, relay R19 does serve to memorize, for the duration of the program corresponding to row P1, the fact that there has been a complete first pulse and since this pulse is the zero time of the system, it does allow energization of relay R1 responsive to the closure of switch RL-3 which is connected by lead 238 to R1. When the first pulse of light disappears the light relay RL switches all return to the positions shown in FIG. 5 and in response to this, there now being a circuit through RL2, relay R19 is energized.

Function relay R1 of FIG. 4 is energized via RL-3 and RL5-2 (now closed) in response to the appearance of the first pulse. This starts the control functions for those having pins P5, P6 . . . axially aligned with P1 on the drum. Relay R1 remains energized due to contacts R18-1 creating a self-holding circuit for coil R18 and also to lead 238.

Responsive to the energization of relay R19, all of its contacts change sense so that R19-3 (FIG. 5) is opened and switches R19-1 and R19-2 are closed. Closure of R19-1 maintains relay R19 in an energized position so that it has the effect of memorizing the first pulse of light, i.e. of memorizing arrival at zero time for starting the control cycle. In review, the first pulse of light energizes relay R1 and permits the function switches to energize selected functions while at the same time closing the switch R19-2 and opening R19-3. Operation of the latter two, as best seen in FIG. 5, serves to set (and reset) the system of FIG. 5 for sequential steps of operation. A channel to start the drum motor 8 has now been created which is responsive only to the pulses appearing to cause closure of the light relay switch RL1. This channel as best seen in FIG. 3 extends from the starting switch through the now-closed contact R19-2, the now open contact RL1, the lead 235, the now closed contacts R20-4 and thence to the motor 8.

The contacts R20-4 have been returned to their closed position by de-energization of relays R20 and R21 when the pulse terminates thereby opening the switch RL1 which shuts off all power to relays R20 and R21.

With the system now at zero time and the first pulse having been memorized by relay R19, the entire system remains in position until the next pulse is created. The drum remains stationary during this time but the motor 136 continues to drive the disc thereby to present the next succeeding slot and generate the required pulse. When this pulse appears, the switch RL1 is closed and completes a circuit from the starting switch to the motor via a bypass around the dead centering switch 28. The bypass is through the lead 235 and normally closed contacts R20-4. When the motor moves off dead center position, the dead centering switch 28 is closed and thereby causes the relays R20 and R21 to energize in sequence. This breaks the circuit through switch R20-4 but simultaneously establishes a circuit through switch R20-3.

The motor continues to drive until it arrives at dead center whereupon switch 28 comes open and the motor stops. As previously explained, the pins on the drum are arranged in a solid row (see FIG. 4) so that the switch L1 remains closed. However, new functions are initiated as far as the control system is concerned by the particular arrangement of pins in the other rows to energize function switches such as L5, L6 . . . . The pulse has a time duration sufficient to allow the motor to step at dead center as just described. This is achieved by providing the slots 137 with sufficient peripheral length so that the pulse is sustained despite the fact that the motor 136 continues to run throughout the cycle. After dead centering, the light slot 137 moves out of the beam and cuts off the light whereby the pulse terminates.

When the pulse terminates, the motor control system of FIG. 3 resets itself. Resetting is necessary because the dead centering switch has energized relays R20 and R21 which remained in that condition as long as the switch RL1 was closed. Thus, the termination of the pulse changes the light relay RL and causes the switch RL1 to come open thus deenergizing the relays R20 and R21 and thereby resetting the system of FIG. 3.

During a control cycle, the above running procedure continues by providing pulses to start the motor by closing switch RL1, stopping the drum motor responsive to the dead centering switch 28, and then resetting the system of FIG. 3 by opening switch RL1 responsive to the termination of the pulse. This allows the drum motor to start in response to the beginning of a pulse, to stop responsive to driving to its next step, and then for the system to reset itself responsive to termination of the pulse. In accomplishing this, a bypass around the dead centering switch is provided so that the motor can jog off dead center.

After completing the cycle of operations, both the drum 2 and the light chopping disc must be brought to their appropriate and respective home positions. To accomplish this it is desired to turn on the high speed homing motor 222 and cause the drum motor to drive so that it moves past any successive number of dead center positions until both the drum and the disc 135 have been brought to their respective home positions, at which time the holding coil R12 is deenergized and the entire system returns to the state shown in FIGS. 6 and 7. The drum motor 8 and the holding motor 222 are almost independent of each other in driving to their respective home positions. However, the homing operation is initiated when the timing motor 136 moves its last slot 137 into light beam-establishing position to cause the motor 8 to begin a step as heretofore described.

When the last slot 137 has created a pulse, the drum motor moves off dead center and in doing so moves the last pin in the row out from under switch L1 so that the latter comes open. Opening of switch L1 deenergizes relays 14, 15 and 16.

Responsive to deenergization of relay 14, the switches R14-1 and R14-2 are returned to the position shown in FIG. 7 and thereby shut off the timing motor 136 and turn on the homing motor 222 and its corresponding light HL.

No immediate response is made when relay R16 is deenergized because of its coupling to relay R17. This particular combination involves two ganged switches R16-1 and R17-1 and two opposite acting coils R16 and R17. When one of the coils has moved the switch to a given position, the switches remain in that position regardless of the energy state of said one coil. The only way the contact switches are moved to another position is by energizing the second of the two coils. In view of this, the switch R16-1 remains closed and connects the homing motor 222 to the power supply by means of lead 240. This connection is independent of the starting switch 220 whereby the homing motor may continue to drive to its respective homing position independently of whether or not the drum motor has reached its home position.

Deenergization of relay R15 responsive to opening switch L1 stops all functions because relay R1 is deenergized responsive to opening of contact R15-2. At the same time relay R15 sets up relay R17 for energization by returning contacts R15-1 to the closed position.

Responsive to the opening of contact R15-2, the relay R18 is also deenergized in response to which relay R19 is deenergized when contacts R18-2 are returned to their normally open position.

Referring for a moment to FIG. 3 for convenience, the switch contacts R19-2 and R19-3 are returned respectively to their normally open and normally closed positions (shown) and relay R19 is deenergized. This resets the system for the next cycle of operation.

Still referring to FIG. 3, the deenergization of relay 14 closes contacts R14-3 and thereby supplies a sustaining voltage to the drum motor 8 which permits the latter to drive home. When the drum motor 8 reaches home it deenergizes itself by opening homing switch H1 thereby shutting off all power because the holding coil R12 is deenergized. The drum motor has now arrived at home and in doing so has reset the homing switches H1 and H2 at their respective open and closed positions at home.

While the drum motor is driving to its home position, the pulse source is doing the same, being driven by the homing motor 222 until the home slot 138 establishes a final home pulse. When this final home pulse is established, the light relay RL closes the contacts RL-3 and completes a circuit to energize relay R17 which causes the contacts R17-1 to close (thus resetting the system for the next operation) and simultaneously opens the switch R16-1 to shut off the homing motor and the homing light, thereby deenergizing the light relay and returning all light relay switches and contacts to the starting position.

The home slot 138 is spaced angularly from the last program slot 137 in each of the programs on the disc 135. The angular spacing is such that the drum motor 8 has time to drive to its home before the home slot establishes the home pulse. As seen, the home pulse sets up the system for the next starting operation.

Although only one modification of the present invention is shown and described herein, it should be apparent that various changes and modifications can be made within the scope of the appended claims.

I claim:

1. A stepping control system for a stepping switch for spacing the steps by predetermined non-discrete time intervals comprising
   a memory device,
   means carried by said memory device for defining a control program,
   a motor for driving said memory device,
   dead centering means for stopping said motor at a predetermined motor position,
   a pulse source means for providing pulses at predetermined time intervals, each pulse having a time base at least as long as required to move said motor from a previous position to said predetermined motor position,
   means for establishing an interruptible bypass path around said dead centering means,
   means for establishing a path to said motor through said bypass in response to the presence of a pulse from said pulse source and to reset said bypass after the motor has arrived at said predetermined position in response to the end of said pulse, and
   means responsive to said dead centering means when said motor is not in said predetermined position for breaking the path to said motor through said bypass and for establishing an alternate path to said motor via said dead centering means,
   whereby the appearance of the pulse starts the motor and thereby establishes a circuit through the dead centering means, the motor moves to the predetermined position and in doing so establishes through the dead centering means the only path to the motor and then that path is interrupted, after which the pulse disappears and the system resets itself.

2. A stepping control system in accordance with claim 1 wherein said pulse source means includes means for establishing a source of light,
   means for responding to said source of light by producing pulses and applying them to said means for establishing,
   and means for establishing a beam of light from said source to another means for responding in accordance with a predetermined program of nondiscrete time intervals.

3. A stepping control system in accordance with claim 1 wherein said one of a plurality of programs may be selectively derived from said pulse source to thereby step said motor in accordance with a selected program and wherein said pulse source further comprises
   a plurality of light sources,
   a plurality of means, each of which responds to a corresponding one of said light sources,
   means for selecting one of said light sources and one of said means for responding,
   means for selecting a control program on said memory device,
   and means for passing light from said selected light sources to said selected means at predetermined times.

4. A starting circuit for a steping switch to operate a motor and a pulse source from the same zero time so that the motor will thereafter operate the stepping switch only in response to said pulse source, said circuit having in combination
   a stepping switch memory device having programming means for defining a program of starting and control functions thereon,
   a motor drivingly connected to said memory device,
   a pulse source,
   means responsive to a predetermined series of positions of said memory device for enabling said pulse source to produce signals,
   a first normally closed switch connected between said starting switch and said motor,
   a first junction,
   a second normally closed switch connected between said starting switch and said first junction,
   a third normally closed switch connected between said first junction and said motor,
   first and second normally open switches connected in series with each other and parallel with said second normally closed switch,
   a dead centering switch and a third normally open switch connected in series with each other and in parallel with said third normally closed switch,
   and means driven by said motor for closing said dead centering switch at one predetermined motor position and for opening the same at all other positions,
   and means responsive to said pulse source to open said second normally closed switch and close said first normally open switch,
   and means responsive to said pulse source terminating a pulse to close said third normally open switch and to open said third normally closed switch,
   and means responsive to said dead centering switch for reversing the respective last-stated positions of said third normally closed and third normally open switches prior to said pulse being absent.

5. Means for starting a stepping switch which steps in spaced-apart predetermined time intervals and comprising the combination of
   a memory device,
   a motor drivingly connected to said memory device,
   a dead centering means connected to said motor for stopping said motor at a predetermined motor position,
   a starting switch,
   means for connecting said starting switch to said motor,
   a pulse source means for providing pulses of a predetermined length,
   means for connecting said starting switch to said pulse source,
   first, second, third, fourth, fifth and sixth switching means for establishing selected paths between said starting switch and said motor responsive to closing said starting switch so that said motor thereafter starts responsive to pulses received through said sixth means from said pulse source and stops responsive to said dead centering means upon the motor arriving at said predetermined motor position,
   all for a predetermined series of steps and wherein
       said first means establishes a first path between said starting switch and said motor,
       said second and third means together establish a second path,
       said second, dead centering and fourth means establish a third path,
       said dead centering, fourth, fifth and sixth means establish a fourth path,
       and said third, fifth and sixth means establish a fifth path,
   means on said memory device for starting said pulse source and for operating said first means to interrupt said first path,
   means responsive to said dead centering means to establish said third path and to interrupt said second path by holding said third means open and to maintain such condition until said dead centering means interrupts said third path,
   means responsive to the appearance and disappearance of a pulse to establish said fifth path with said sixth switching means interrupting the same,
   and means to reset the system for operation only in response to said sixth means by substituting said third means for said dead centering and said fourth means to thereby establish said fifth path.

6. A control system for a step type timer comprising a memory device for actuating a number of functions in a preselected cycle of operations,
   motor means for driving said memory device through a complete cycle of operations,
   pulse source means for intermittently energizing said motor means to advance said memory device in a step-by-step manner,
   said pulse source means including a light source, a light responsive device and a motor driven disc positioned to rotate between said light source and said light responsive device,
       said disc having a number of slots cut in a circle therein for allowing light to pass through said disc to actuate said light responsive device,
           the angular distance between the slots in the disc determining the time intervals of operation for the functions in the cycle of operation.

7. A control system according to claim 6 including means for stopping the memory device and the disc at their starting points after a complete cycle of operations.

References Cited by the Examiner

UNITED STATES PATENTS

| 2,519,688 | 8/50 | Mitchell | 250—219 X |
| 2,555,994 | 6/51 | Pennell | 307—112 |
| 2,833,940 | 5/58 | Harris | 307—112 |

OTHER REFERENCES

IBM Technical Disclosure Bulletin, Volume 1, No. 3, October 1958, page 9.

LLOYD McCOLLUM, *Primary Examiner.*